(12) United States Patent
Broere

(10) Patent No.: US 10,971,910 B2
(45) Date of Patent: Apr. 6, 2021

(54) RECESSED PROTECTIVE APPARATUS FOR OUTDOOR ELECTRICAL OUTLETS

(71) Applicant: A. C. DANDY PRODUCTS LTD., Wetaskiwin (CA)

(72) Inventor: Hans Broere, Wetaskiwin (CA)

(73) Assignee: A. C. Dandy Products Ltd., Wetaskiwin (CA)

(*) Notice: Subject to any disclaimer, the term of this patent is extended or adjusted under 35 U.S.C. 154(b) by 0 days.

(21) Appl. No.: 16/797,998

(22) Filed: Feb. 21, 2020

(65) Prior Publication Data

US 2020/0194982 A1 Jun. 18, 2020

Related U.S. Application Data

(63) Continuation of application No. 15/991,850, filed on May 29, 2018.

(60) Provisional application No. 62/512,494, filed on May 30, 2017.

(51) Int. Cl.
*H02G 3/08* (2006.01)
*H01R 24/76* (2011.01)
*H02B 1/50* (2006.01)
*H02G 3/04* (2006.01)

(52) U.S. Cl.
CPC ............. *H02G 3/088* (2013.01); *H01R 24/76* (2013.01); *H02B 1/50* (2013.01); *H02G 3/0493* (2013.01)

(58) Field of Classification Search
CPC .......... H02G 3/08; H02G 3/081; H02G 3/088; H02G 3/10; H02G 3/12; H02G 3/121; H02G 3/126; H01R 24/76; H02B 1/50; H02B 1/46; H02B 1/48; H02B 1/40; H05K 5/02; H05K 5/0004; H05K 5/0217; H05K 5/0247; H05K 5/04; H05K 5/00
USPC .......... 174/480, 481, 50, 53, 57, 58, 490, 54; 220/3.2–3.9, 4.02; 248/906
See application file for complete search history.

(56) References Cited

U.S. PATENT DOCUMENTS

| | | |
|---|---|---|
| 3,439,108 A | 4/1969 | Zerwes |
| 4,674,813 A | 6/1987 | Feldner |
| 4,721,476 A | 1/1988 | Zeliff |
| 4,758,687 A | 7/1988 | Lathrop |
| 4,785,376 A | 11/1988 | Dively |
| 4,873,600 A | 10/1989 | Vogele |
| 5,349,134 A | 9/1994 | Russell |
| 7,057,105 B2 | 6/2006 | Gottardo |
| 7,361,832 B2 | 4/2008 | Dively |
| 7,476,803 B2 | 1/2009 | Dinh |
| 7,595,446 B2 | 9/2009 | Turcovsky |

(Continued)

*Primary Examiner* — Angel R Estrada
(74) *Attorney, Agent, or Firm* — Donald V. Tomkins

(57) ABSTRACT

A mounting device for outdoor electrical outlets includes an upper plate and a lower plate arranged and interconnected in a generally V-shaped configuration, and is adapted for recessed installation into a power pedestal or other structure. The upper and lower plates may be contiguous along their inner edges. Alternatively, an intermediate plate may be disposed therebetween, giving the mounting device a trapezoidal configuration. Either or both of the upper and lower plates may be sloped, and side plates may extend between the side edges of the upper and lower plates. The upper plate has an aperture for an electrical outlet, which when installed in the aperture will face generally downward and thus be protected from rain and snow. The outer edges of the upper and lower plates, and of the side plates when present, may have mounting flanges to facilitate installation of the mounting device in a power pedestal.

11 Claims, 3 Drawing Sheets

(56) References Cited

U.S. PATENT DOCUMENTS

| | | |
|---|---|---|
| 8,049,107 B2 | 11/2011 | Dinh |
| 8,404,973 B1 | 3/2013 | Gretz |
| 8,569,619 B2 | 10/2013 | Gretz |
| 8,921,714 B2 | 12/2014 | Haberek |
| 2005/0194167 A1 | 9/2005 | Kiyota et al. |
| 2014/0020925 A1 | 1/2014 | Seff et al. |
| 2015/0111423 A1 | 4/2015 | Broere |

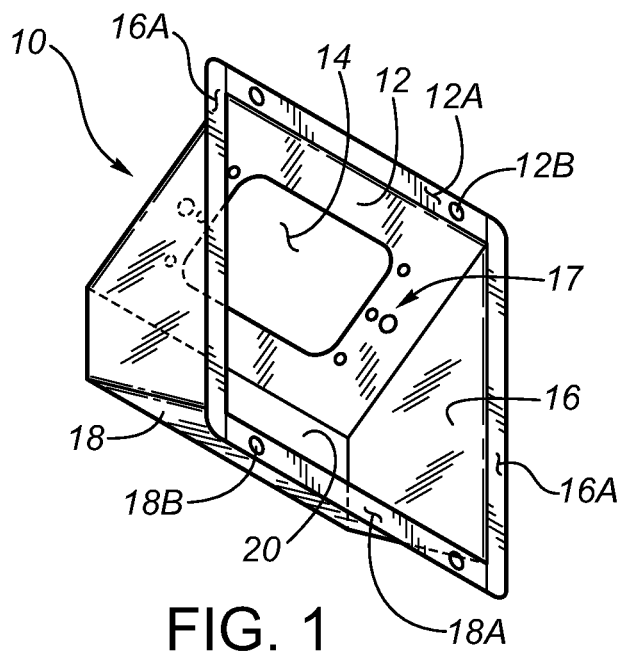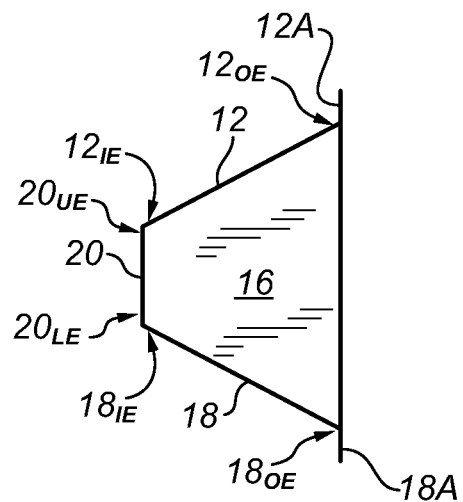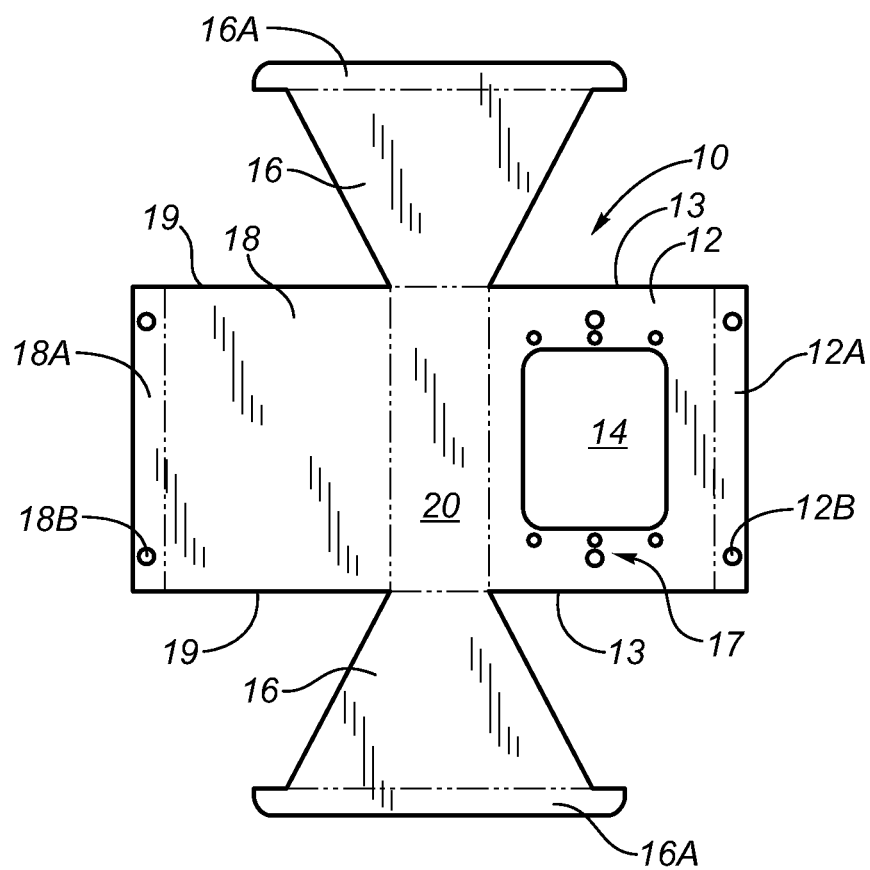

RECESSED PROTECTIVE APPARATUS FOR OUTDOOR ELECTRICAL OUTLETS

FIELD

The present disclosure relates in general to outdoor power outlets and other types of electrical receptacles for installation in power pedestals and other structures, and relates in particularly to apparatus for providing such outlets and receptacles with protection from weather conditions such as rain and snow. The present disclosure also relates to power pedestals in which electrical power outlets can be mounted.

BACKGROUND

It is common for electrical power outlets to be mounted on exterior walls of residential, commercial, and industrial building structures, for a variety of purposes including providing power for tools, equipment, and block heaters for vehicle motors, as well for recharging batteries in electric vehicles. As well, power outlets are commonly mounted in isolated power pedestals, such as in vehicle parking lots.

Conventional outdoor power outlets are commonly protected by hinged covers (such as "flip covers") incorporated into or installed over individual outlets such that they can be lifted to provide access to the outlets. Such covers may include gaskets or other sealing means to protect the receptacles from weather elements such as rain and snow.

Prior art protective devices such as the flip covers described above suffer from a number of limitations. For example, when outside air temperatures are near or below freezing, a flip cover can become sealed shut due to ice (such as from freezing rain or refrozen snowmelt water) forming between the cover and the outlet and/or the adjacent structure in which the outlet is mounted, such that the cover cannot be easily lifted to access the outlet.

Even if its protective cover can be lifted, a power outlet mounted in an exterior wall of a building or other structure can be susceptible to an accumulation of ice or snow during the time it remains open. Such undesirable accumulation of ice or snow may make it difficult or impossible to close the cover completely, as the ice and snow may prevent clean sealing contact between the cover and the outlet or adjacent structure. Furthermore, the cover itself may become frozen in the open position, making it difficult or impossible to close.

Another limitation of conventional protective covers for outdoor power outlets is that associated gaskets or other sealing means may deteriorate over time, such that the gaskets' sealing effectiveness becomes degraded, in which case moisture infiltrating or seeping into the outlets as a result of the gaskets' loss of effectiveness can cause electrical safety problems. Although the risks of short-circuiting and electrical shock due to moisture infiltration can be reduced by the use of power outlets incorporating GFCI (Ground Fault Circuit Interruptor) protection, GFCI-protected outlets can still become damaged from exposure to moisture.

Problems as described above can be mitigated by the use of alternative means for installation and protection of outdoor power outlets that do not require the use of hinged covers. One example of this may be seen in U.S. patent application Ser. No. 15/617,210 (Pub. No. 2018/0040995) and the corresponding Canadian Patent No. 2,868,890, which teach a protective hood mountable on a power pedestal, with an upper plate section that slopes downward and away from the pedestal, and a bottom plate section that slopes downward from the outer edge of the upper plate and back toward the pedestal. The sloping bottom plate has an opening in which a power outlet can be mounted. The angle of the bottom plate is selected to prevent or minimize direct exposure of the mounted power outlet to rain and snow. However, because it projects away from the power pedestal on which it is mounted, this angled hood and the power outlet mounted therein are susceptible to damage from accidental vehicular impact or other possible causes.

For reasons including the foregoing, there is a need for improved means for protecting outdoor power outlets from exposure to rain, snow, and other weather conditions.

BRIEF SUMMARY

The present disclosure teaches embodiments of a mounting device for outdoor electrical outlets. The device includes an upper section (typically but not necessarily a flat plate) and a lower section (typically but not necessarily a flat plate) arranged and interconnected in a generally V-shaped configuration, and it is adapted for recessed installation into a power pedestal or other structure. Either or both of the upper and lower plates may be sloped. The upper plate has an aperture for receiving an electrical outlet, which when installed in the aperture will face generally downward and thus will be protected against direct exposure to environmental elements such as rain and snow, without the need for sealing cover means or indeed any cover means at all.

The present disclosure also teaches embodiments of power pedestals in which outlet mounting devices in accordance with this disclosure have been installed.

In general terms, the electrical outlet mounting device, as viewed in vertical cross-section after being mounted into a vertical face of a power pedestal or other structure, may be configured in the general shape of the letter "V" rotated 90 degrees (i.e., like the symbol shown to the right: <). For purposes of this patent document, this shape may be referred to as a "rotated V-shape". Accordingly, the planes of the upper and lower plates will typically be oriented at different angles.

In one embodiment, the upper and lower plates are contiguous along their respective inner edges, with the upper plate sloping upward and away, and the lower plate sloping downward and away, from the conjunction of the upper and lower plates. In an alternative embodiment, an intermediate section (typically but not necessarily a flat plate) may extend between the inner edges of the upper and lower plates, giving the mounting device a truncated V-shape or trapezoidal configuration in cross-section. This intermediate plate would typically be substantially vertical in the installed mounting device, but this is not essential; in variant embodiments, the rear wall could be sloped relative to the vertical.

The outlet mounting device is adapted for installation within an opening formed in a power pedestal or a building structure, such that the upper and lower plates of the mounting device will be disposed substantially entirely within the power pedestal or building structure. Accordingly, a power outlet mounted in the outlet mounting device will be shielded from precipitation by the pedestal or building structure in which the outlet mounting device is installed, with protection against wind-driven rain and snow being provided by virtue of the outlet being mounted on a non-vertical element (i.e., the upper plate). The sloped lower plate of the outlet mounting device will shed rainwater and deter accumulation of snow within the device, with the lower plate's effectiveness for that purpose being related to its slope angle. With the outlet mounting device being recessed into the pedestal or building structure, the mounted outlet will also be less susceptible to accidental physical damage.

The outlet mounting device may be provided with connection means such as a lip or flange, or a number of tabs, along the outer edges of the upper and lower plates, for abutment against the face of the power pedestal or building structure around the opening therein, with such lips, flanges, or tabs being provided with fastener holes for fixing the outlet mounting device to the pedestal or building structure. However, this is by way of non-limiting example only; any other suitable method or means for fixing the outlet mounting device to a power pedestal or building may be used without departing from the scope of this disclosure.

The outlet mounting device may also be provided with vertical side plates extending between the side edges of the upper and lower plates of the device. Optionally, the side plates may be provided with lips, flanges, tabs, or other means for fastening to a power pedestal or building structure.

Embodiments within the scope of the present disclosure are not limited to or restricted to any specific ranges with respect to sizes and angular configurations of the upper and lower sections of the outlet mounting device. The various dimensions of a given embodiment will be dictated only by the need to facilitate access to the power outlet mounted therein and to provide protection against exposure to the weather as appropriate for case-specific service conditions.

More specifically in this regard, it is not essential for the upper plate of the outlet mounting device to be sloped at a significant angle relative to horizontal in the installed device, or in fact to be sloped at all. In variant embodiments, the upper plate could be horizontal, such that a power outlet mounted therein will face straight down rather than at an angle. Although access to the power outlet might be less convenient than if the upper plate were sloped, such variant embodiments provide the outlet with maximum protection against direct exposure to the elements, especially wind-driven rain and snow.

Similarly, it is not essential for the lower plate to be significantly sloped relative to horizontal, even in embodiments where the upper plate is not sloped significantly or at all. Although it is desirable for the lower plate to be sloped to shed water and to deter accumulation of dust and debris, embodiments having a shallow-sloped or even horizontal lower plate will still come within the scope of the present disclosure, irrespective of the angular orientation of the upper plate.

In summary, the scope of the present disclosure encompasses outlet mounting devices comprising:
  Contiguous sloped upper and lower sections (e.g., plates), forming a rotated (but not necessarily symmetrical) V-shape, as viewed in vertical cross-section;
  Sloped upper and lower plates with an intermediate plate, forming a generally trapezoidal (or "truncated V") shape, as viewed in vertical cross-section;
  A horizontal upper plate contiguous with a sloped lower plate, forming a rotated V-shape;
  A horizontal upper plate, a sloped lower plate, and an intermediate plate, forming a generally trapezoidal or "truncated V" shape;
  A sloped upper plate, a horizontal lower plate, and an intermediate plate, forming a generally trapezoidal or "truncated V" shape; and Obvious variants of these configurations.

BRIEF DESCRIPTION OF THE DRAWINGS

Embodiments will now be described with reference to the accompanying Figures, in which numerical references denote like parts, and in which:

FIG. 1 is an isometric view of a first embodiment of a power outlet mounting device in accordance with the present disclosure.

FIG. 1A is a plan view of a metal stamping which may be used to form the outlet mounting device shown in FIG. 1.

FIG. 2 is a side view of the outlet mounting device in FIG. 1.

DESCRIPTION

Figure 3:
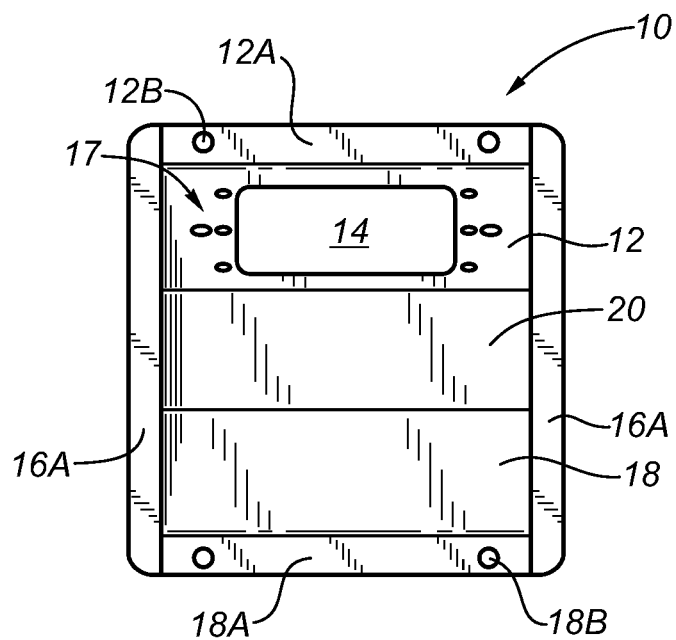
FIG. 3 is a front view of the outlet mounting device in FIG. 1.

FIGS. 1, 1A, and 2 illustrate a first embodiment 10 of a power outlet mounting device in accordance with the present disclosure. As illustrated, outlet mounting device 10 includes:
  an upper plate 12 having an inner edge $12_{IE}$, an outer edge $12_{OE}$, and two opposing side edges 13 extending between inner edge $12_{IE}$ and outer edge $12_{OE}$, plus an aperture 14 for receiving a power outlet;
  a lower plate 18 having an inner edge $18_{IE}$, an outer edge $18_{OE}$, and two opposing side edges 19 extending between inner edge $18_{IE}$ and outer edge $18_{OE}$;
  an intermediate plate 20 having an upper edge $20_{UE}$ contiguous with inner edge $12_{IE}$ of upper plate 12, a lower edge $20_{LE}$ contiguous with inner edge $18_{IE}$ of lower plate 18, and two opposing side edges 21; and
  a pair of side plates 16, each extending between one of the side edges 13 of upper plate 12 and a corresponding side edge 19 of lower plate 18.

Upper plate 12 may be provided with a suitably configured array of mounting holes (generally denoted by reference number 17) for mounting a power outlet in aperture 14 in upper plate 12. The power outlet may be mounted to upper plate 12 using suitable conventional means, preferably including installation of a gasket to maintain a weather-tight seal. Alternatively, the power outlet may be mounted using mounting plates or adapter plates.

As illustrated in FIGS. 1, 1A, and 3, upper plate 12 may be formed with a mounting flange 12A provided along its outer edge $12_{OE}$, with flange 12A having suitable fastener holes 12B to facilitate fastening to a power pedestal or other structure in which mounting device 10 is being installed. The provision of mounting flange 12A also facilitates installation of a gasket, caulking bead, or other sealing means. Similarly, lower plate 18 may be provided with a mounting flange 18A (with fastener holes 18B) along its outer edge $18_{OE}$. As well, side plates 16 optionally may be provided with mounting flanges 16A along their outer edges $16_{OE}$. Flanges 16A are not shown with fastener holes, since such holes might not be necessary if mounting device 10 is installed with fasteners through holes 12A and 18A in upper and lower plates 12 and 18; however, fastener holes can also be provided in flanges 16A if desired.

Figure 5:
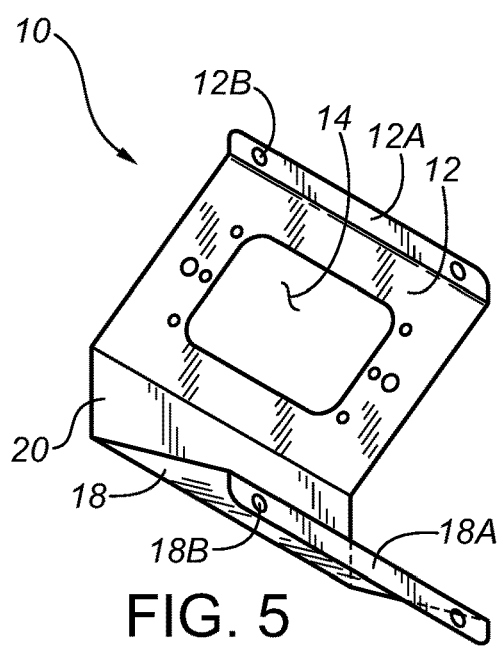
FIG. 5 is an isometric view of a second embodiment of a power outlet mounting device in accordance with the present disclosure.
Figure 7:
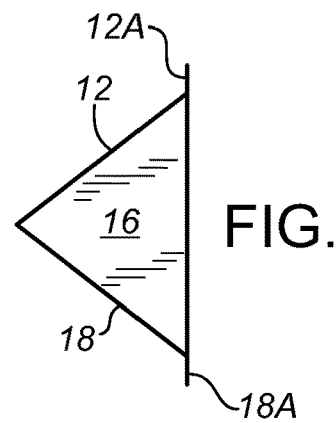
FIGS. 7 to 10 are side views of alternative configurations of power outlet mounting devices within the scope of the present disclosure.
Figure 8:
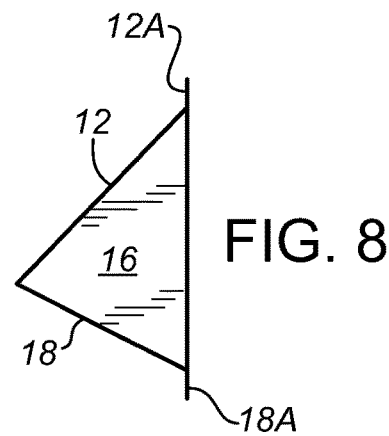
Figure 6:
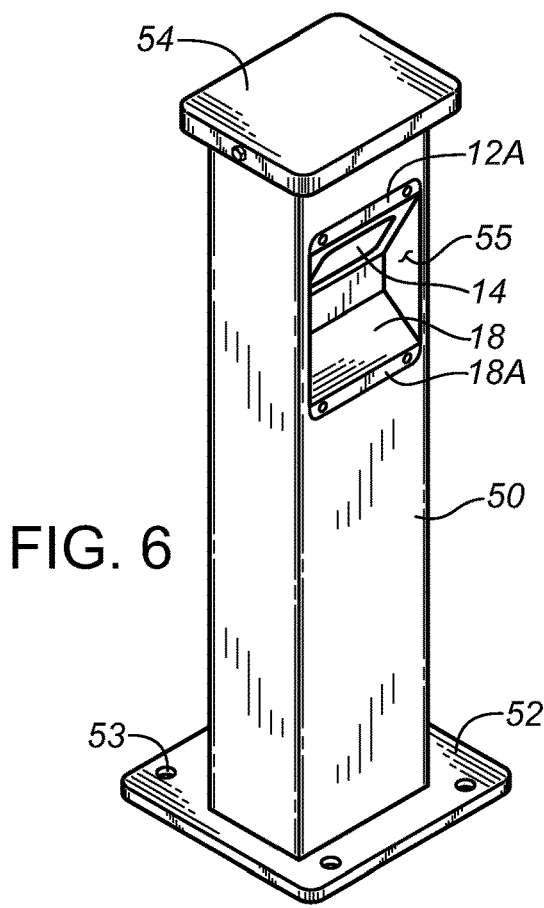
FIG. 6 is an isometric view of the outlet mounting device in FIG. 5, as mounted in a power pedestal.
Figure 9:
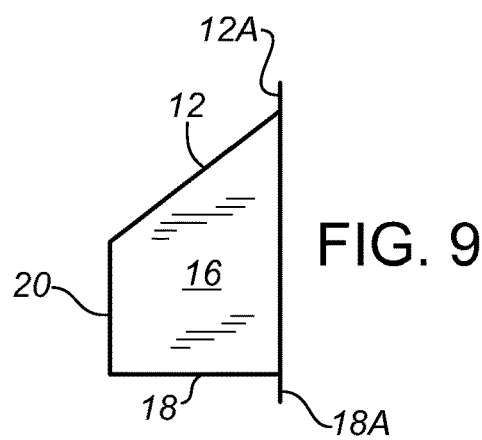
Figure 10:
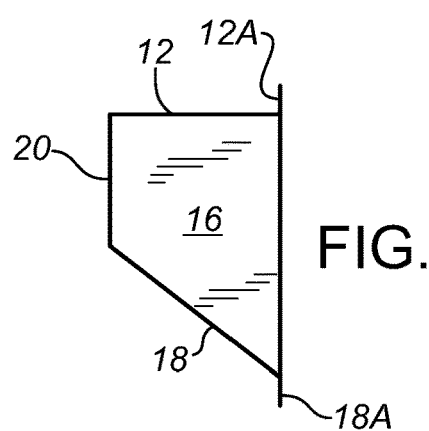

Side plates 16 are not essential to all embodiments within the scope of the present disclosure, and may be omitted in some embodiments of mounting device 10, such as the variant embodiment 110 shown in FIGS. 5 and 6. Although the variant embodiments in FIGS. 7-10 are shown as having side plates 16, it will be understood that side plates 16 could be omitted from any of these embodiments as well.

Intermediate plate 20 provides additional separation between upper plate 12 and lower plate 18, which may be beneficial to provide more convenient access to the power outlet mounted in aperture 14 in upper plate 12. However, intermediate plate 20 is not essential to all embodiments of the outlet mounting device, and may be omitted in variant embodiments of the outlet mounting device, such as but not limited to the variants shown in FIGS. 7 and 8.

Mounting device 10 may be fashioned from any suitable material, including but not limited to metallic materials, rigid polymeric materials, resilient polymeric materials, and moldable polymeric materials (e.g., plastics). It may be of unitary construction, or it may be made from multiple separate components assembled and joined together. As illustrated by way of non-limiting example in FIG. 1A, the specific embodiment of mounting device 10 shown in FIGS. 1, 2, and 3 may be manufactured from a single metal sheet, suitably stamped or cut, and then bent or folded into its final configuration. Other processes that may be used for manufacturing mounting device 10 include casting and injection molding.

It will typically be preferable for any seams or joints between adjoining components of mounting device 10 to be sealed in order to make them substantially air-tight or water-tight. In some applications, however, it may be desirable to provide small openings or gaps between adjoining components (such as along seams between upper plate 12 and side plates 16) to provide ventilation behind mounting device 10 when it is mounted into a power pedestal or a structural wall.

Figure 4:
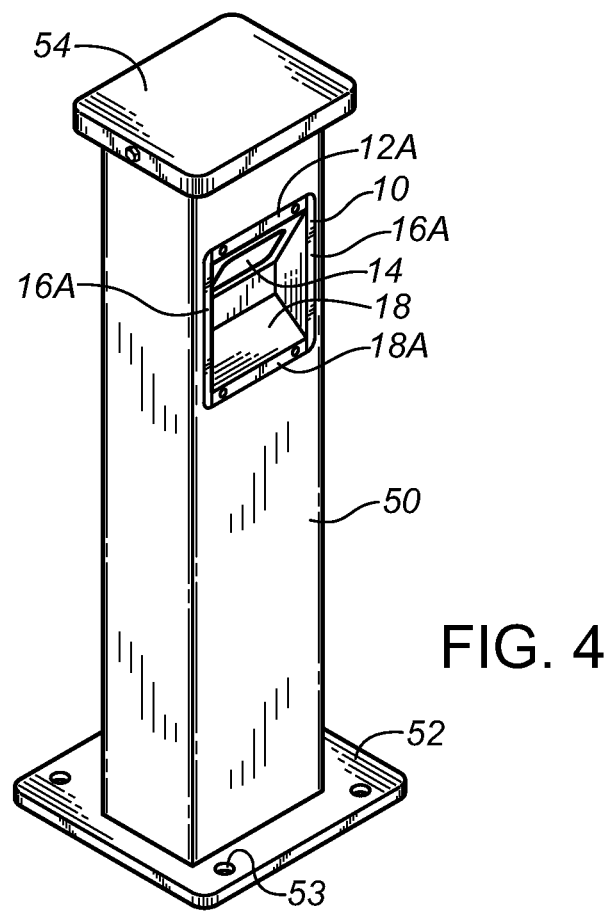
FIG. 4 is an isometric view of the outlet mounting device in FIG. 1, as installed in a power pedestal.

FIG. 4 illustrates a power pedestal 50 in which a power outlet mounting device 10 as in FIGS. 1, 2, and 3 has been installed. Power pedestals can be of various different configurations, but for illustration purposes power pedestal 50 is shown as a length of hollow square tubing mounted on a base plate 52 with anchor bolt holes 53, and having a cap plate 54. As shown, an opening has been provided in one side face of pedestal 50 to receive mounting device 10, which may be fastened to pedestal 50 using suitable fasteners (not shown) inserted through fastener holes 12B and 18B in mounting flanges 12A and 18A. The provision of suitable gaskets or other sealing means between mounting flanges 12A, 16A, and 18A, and also between upper plate 12 and the power outlet mounted in aperture 14 of upper plate 12 of mounting device 10, will protect against entry of moisture into the hollow interior of pedestal 50.

FIG. 6 illustrates a power pedestal 50 in which a variant power outlet mounting device 110 as in FIG. 5 has been installed. This installation is generally similar to the installation shown in FIG. 4, but because mounting device 110 does not have side plates 16 as in mounting device 10, side edges 13, 19, and 21 of upper, lower, and intermediate plates 12, 18, and 20 (respectively) will lie adjacent to an interior surface 55 of pedestal 50, ideally close enough to interior surface 55 to effectively prevent ingress of windblown debris into the interior of pedestal 50, but in any event preferably at least close enough to facilitate application of caulking (for example) to provide an effective seal along the junctures of side edges 13, 19, and 21 and interior surface 55. A suitable protective coating may be applied to the exposed portion of interior surface 55, as may be appropriate for the conditions to which pedestal 50 might be exposed.

Pedestal 50 optionally may be provided with one or more ventilation grills (not shown) adapted to prevent moisture entry while at the same time facilitating air circulation within the interior of pedestal 50.

Pedestal 50 may be made from any suitable metal, plastic, or polymeric material, including resilient or non-rigid materials. By way of non-limiting example, pedestal 50 may be formed from molded polyurethane, as in power pedestals described in U.S. Pat. No. 9,048,636.

References herein to "one embodiment" or "an embodiment" (or similar phrases) are to be understood as indicating that while the described embodiment may include a particular aspect, feature, structure, or characteristic, but not every embodiment necessarily includes that aspect, feature, structure, or characteristic. Moreover, a particular reference to "an embodiment" or "one embodiment" may, but do not necessarily, relate to any embodiment that may referenced elsewhere in the specification using the same phrase. Further, where a particular aspect, feature, structure, or characteristic is described in connection with a particular embodiment, it will be within the knowledge and capability of persons skilled in the art to associate or combine such aspect, feature, structure, or characteristic with other embodiments, whether explicitly described or not. In other words, any described element or feature may be combined with any other element or feature in different embodiments, unless there is an obvious or inherent incompatibility between elements or features, or unless such combination is specifically and expressly excluded.

It is further noted that the claims may be drafted to exclude any optional element. As such, this statement is intended to serve as antecedent basis for the use of exclusive terminology, such as "solely," "only," and the like, in connection with the recitation of claim elements or the use of a "negative" limitation. The terms "preferably," "preferred," "prefer," "optionally," "may," and similar terms are used to indicate that an item, condition or step being referred to is an optional rather than essential feature.

It will be readily appreciated by those skilled in the art that various modifications to embodiments in accordance with the present disclosure may be devised without departing from the scope of the present teachings, including modifications which may use equivalent structures or materials hereafter conceived or developed. It is to be especially understood that the scope of the present disclosure is not intended to be limited to described or illustrated embodiments, and that the substitution of a variant of a claimed or illustrated element or feature, without any substantial resultant change in functionality, will not constitute a departure from the scope of the disclosure.

In this patent document, any form of the word "comprise" is intended to be understood in a non-limiting sense, meaning that any item following such word is included, but items not specifically mentioned are not excluded. A reference to an element by the indefinite article "a" does not exclude the possibility that more than one such element is present, unless the context clearly requires that there be one and only one such element. Any use of any form of any term describing an interaction between elements is not meant to limit the interaction to direct interaction between the elements in question, but may also extend to indirect interaction between the elements such as through secondary or intermediary structure. Any use of any form of the word "typical" is to be interpreted in the sense of being representative of common usage or practice, and is not to be interpreted as implying essentiality or invariability.

Relational and conformational terms used herein, such as (but not limited to) "horizontal", "vertical", and "trapezoidal", are not intended to denote or require absolute mathematical or geometrical precision. Accordingly, such terms are to be understood as denoting or requiring substantial precision only (e.g., "substantially horizontal" or "generally trapezoidal") unless the context clearly requires otherwise.

The adjectives "upper", "lower", "inner", and "outer", as used with reference to particular components or features of embodiments of outlet mounting devices within the scope of the present disclosure, are to be understood with reference to such devices as they would be oriented when installed into a vertical surface of a power pedestal or other structure, and the scope of the present disclosure and claimed embodiments is intended to extend to installations of such outlet mounting devices into non-vertical surfaces, notwithstanding that the above-noted adjectives might not be literally applicable when the outlet mounting devices are installed in some alternative spatial orientations.

What is claimed is:

1. A structure enclosing an interior space, said structure including an exterior vertical wall having an exterior surface, wherein said exterior surface has a wall opening in which a protective device for an electrical outlet is installed, said protective device comprising:
    (a) an upper section having an inner edge, an outer edge, and opposing side edges extending between said inner and outer edges of the upper section, said upper section defining an aperture for mounting an electrical outlet;
    (b) a lower section having an inner edge, an outer edge, and opposing side edges extending between said inner and outer edges of the lower section;
    (c) a first flange extending vertically upward from the outer edge of the upper section; and
    (d) a second flange extending vertically downward from the outer edge of the lower section;
wherein:
    (e) the upper and lower sections of the protective device are contiguous along their respective inner edges;
    (f) the planes of the upper and lower sections of the protective device are angled relative to each other such that the protective device has a rotated V-shape as viewed in vertical cross-section, with the lower section of the protective device sloping downward and away from its inner edge;
    (g) each side edge of the upper section of the protective device and the corresponding side edge of the lower section of the protective device lie in a common vertical plane;
    (h) the protective device is installed within the wall opening such that the first and second flanges of the protective device respectively abut the exterior surface of the exterior vertical wall above and below the wall opening, such that the upper and lower sections of the protective device extend into the interior space enclosed by the structure; and
    (i) the protective device does not have a cover.

2. A structure as in claim 1, wherein the protective device further comprises a vertical side section extending between one of the side edges of the upper section of the protective device and the corresponding side edge of the lower section of the protective device.

3. A structure as in claim 1, wherein the upper section of the protective device is horizontal.

4. A structure as in claim 1, wherein the structure is a power pedestal.

5. A structure as in claim 1, wherein the exterior vertical wall is an exterior wall of a building.

6. A structure enclosing an interior space, said structure including an exterior vertical wall having an exterior surface, wherein said exterior surface has an wall opening in which a protective device for an electrical outlet is installed, said protective device comprising:
    (a) an upper section having an inner edge, an outer edge, and opposing side edges extending between said inner and outer edges of the upper section, said upper section defining an aperture for mounting an electrical outlet;
    (b) a lower section having an inner edge, an outer edge, and opposing side edges extending between said inner and outer edges of the lower section;
    (c) an intermediate section having an upper edge contiguous with the inner edge of the upper section, and a lower edge contiguous with the inner edge of the lower section;
    (d) a first flange extending vertically upward from the outer edge of the upper section; and
    (e) a second flange extending vertically downward from the outer edge of the lower section;
wherein:
    (f) the planes of the upper and lower sections of the protective device are angled relative to each other such that the protective device has a trapezoidal configuration as viewed in vertical cross-section, with the lower section of the protective device sloping downward and away from its inner edge;
    (g) each side edge of the upper section of the protective device and the corresponding side edges of the intermediate and lower sections of the protective device lie in a common vertical plane;
    (h) the protective device is installed within the wall opening such that the first and second flanges of the protective device respectively abut the exterior surface of the exterior vertical wall above and below the wall opening, such that the upper, intermediate, and lower sections of the protective device extend into the interior space enclosed by the structure; and
    (i) the protective device does not have a cover.

7. A structure as in claim 6, wherein the protective device further comprises a vertical side section extending between one of the side edges of the upper section of the protective device and the corresponding side edge of the lower section of the protective device.

8. A structure as in claim 6, wherein the upper section of the protective device slopes upward from its inner edge toward its outer edge.

9. A structure as in claim 6, wherein the upper section of the protective device is horizontal.

10. A structure as in claim 6, wherein the structure is a power pedestal.

11. A structure as in claim 6, wherein the exterior vertical wall is an exterior wall of a building.

* * * * *